United States Patent
Decoster et al.

(10) Patent No.: US 8,403,360 B2
(45) Date of Patent: Mar. 26, 2013

(54) OCCUPANT CLASSIFICATION SYSTEM

(75) Inventors: Yves Decoster, Ethe (BE); Laurent Lamesch, Lamadelaine (LU); Pierre Orlewski, Ettelbruck (LU); Patrick Di Mario Cola, Fontoy (FR); Christophe Keiser, Bejing (CN); Roberto Orsello, Luxembourg (LU)

(73) Assignee: IEE International Electronics & Engineering S.A., Luxembourg (LU)

( * ) Notice: Subject to any disclaimer, the term of this patent is extended or adjusted under 35 U.S.C. 154(b) by 752 days.

(21) Appl. No.: 12/293,720

(22) PCT Filed: Mar. 19, 2007

(86) PCT No.: PCT/EP2007/052594
§ 371 (c)(1),
(2), (4) Date: Oct. 5, 2009

(87) PCT Pub. No.: WO2007/107547
PCT Pub. Date: Sep. 27, 2007

(65) Prior Publication Data
US 2011/0180343 A1 Jul. 28, 2011

(30) Foreign Application Priority Data
Mar. 20, 2006 (EP) .................................. 06111416

(51) Int. Cl.
*B60R 21/015* (2006.01)
(52) U.S. Cl. .......................................... 280/735; 701/45
(58) Field of Classification Search .................. 180/271; 280/735; 342/72; 701/45
See application file for complete search history.

(56) References Cited

U.S. PATENT DOCUMENTS

| | | | | |
|---|---|---|---|---|
| 5,330,226 A | * | 7/1994 | Gentry et al. | 280/735 |
| 5,770,997 A | * | 6/1998 | Kleinberg et al. | 340/438 |
| 5,936,412 A | * | 8/1999 | Gershenfeld et al. | 324/663 |
| 5,948,031 A | * | 9/1999 | Jinno et al. | 701/45 |
| 6,199,904 B1 | * | 3/2001 | Dosdall | 280/735 |
| 6,220,627 B1 | * | 4/2001 | Stanley | 280/735 |
| 6,302,438 B1 | | 10/2001 | Stopper, Jr. et al. | |
| 7,791,476 B2 | * | 9/2010 | Hawkins et al. | 340/561 |
| 2002/0102943 A1 | * | 8/2002 | Takikita | 455/67.6 |
| 2002/0140215 A1 | * | 10/2002 | Breed et al. | 280/735 |
| 2003/0038719 A1 | * | 2/2003 | Mattes et al. | 340/541 |
| 2003/0047998 A1 | * | 3/2003 | Lester | 307/10.1 |
| 2003/0151240 A1 | * | 8/2003 | Saitou et al. | 280/735 |
| 2005/0038586 A1 | | 2/2005 | Griffin et al. | |

(Continued)

OTHER PUBLICATIONS

Dictionary.com, "microwave," in The American Heritage® Science Dictionary. Source location: Houghton Mifflin Company. http://dictionary.reference.com/browse/microwave. Available: http://dictionary.reference.com. Accessed: May 14, 2012.*

(Continued)

*Primary Examiner* — Joseph Rocca
(74) *Attorney, Agent, or Firm* — Cantor Colburn LLP

(57) ABSTRACT

An occupant classification system for a vehicle comprises a radio-frequency (RF) transmitter unit, which includes a transmission RF antenna and an RF generator operatively connected to the transmission RF antenna. The RF generator and the transmission RF antenna are configured for generating radio waves at a certain fixed RF frequency in the Very High Frequency (VHF) range or the Ultra High Frequency (UHF) range. During operation of the RF transmitter unit, the generated radio waves propagate from the transmission RF antenna. The occupant classification system further comprises an RF detector for detecting, at the fixed RF frequency, an influence of an occupant on the radio waves propagating from the transmission RF antenna.

14 Claims, 3 Drawing Sheets

U.S. PATENT DOCUMENTS

| | | | |
|---|---|---|---|
| 2005/0121885 A1* | 6/2005 | Shieh | 280/730.1 |
| 2005/0269810 A1 | 12/2005 | Breed et al. | |
| 2005/0280556 A1* | 12/2005 | Hofbeck et al. | 340/937 |
| 2006/0092023 A1* | 5/2006 | Hofbeck et al. | 340/561 |
| 2006/0152347 A1* | 7/2006 | Hofbeck et al. | 340/425.5 |
| 2011/0180343 A1* | 7/2011 | Decoster et al. | 180/271 |

OTHER PUBLICATIONS eEngineer—Radio Frequency Band Designations, available at http://www.radioing.com/eengineer/bands.html (last visited May 14, 2012).*

Medical diathermy—definition of medical diathermy in the Medical dictionary, available at http://medical-dictionary.thefreedictionary.com/medical+diathermy (last visited May 14, 2012).*

Antenna Definition, Merriam-Websters Online Dictionary, available at http://www.merriam-webster.com/dictionary/antenna (last vistied May 17, 2012).*

Antenna Definition, Dictionary.Com, available at http://dictionary.reference.com/browse/antenna?s=t (last vistied May 17, 2012).*

International Search Report PCT/EP2007/052594; Dated Jun. 15, 2007.

* cited by examiner

OCCUPANT CLASSIFICATION SYSTEM

TECHNICAL FIELD OF THE INVENTION

The present invention generally relates to automotive occupancy sensor systems for determining the presence of an object or a passenger in a seat, in order to provide an occupancy state or condition signal for use with a safety restraint system control. The present invention more specifically relates to an occupant classification system.

BRIEF DISCUSSION OF RELATED ART

In order to protect the lives of passengers during a traffic accident, modern vehicles are generally provided with a protection system comprising several airbags and seat belt pretensioners, which are used to absorb the energy of a passenger released during the collision due to the accident. It is clear that such protection systems are most effective when they are well adapted to the specific requirements of actual seat occupancy. That is why microprocessor-controlled protection systems have been designed which provide several operational modes, allowing for example an adaptation of the instant at which airbags are deployed, the volume to which the airbags are inflated, the instant at which safety belts are released after the collision, etc, as a function of the stature of a passenger on the seat. In order to enable the control microprocessor to select the optimum operational mode for a given seat occupancy status, it is of course necessary to detect one or several parameters characterizing the occupancy status of the seat and to classify the occupancy into one of several classes, each of which is associated to a specific operational mode of the restraint system.

Although the merit of airbags is largely recognized in the interest of passenger safety, there are situations in which the deployment of an airbag is not desired or may be harmful or even constitute serious danger. For instance, in order to reduce the costs for the reparation of the vehicle, the airbag associated with a seat should be disabled when the respective seat is not occupied. Moreover, the presence of an auxiliary child restraint seat (CRS) on the passenger seat may represent a situation, where the deployment of the airbags should be disabled. In fact, for most auxiliary child restraint seats, which point in the opposite direction to the direction of travel of the vehicle, i.e. rear facing infant seats, there is the risk that the deployment of the airbag will throw the child together with the seat violently towards the rear of the vehicle and will be the cause of serious injury. It follows that the occupancy parameters for these cases should also be reliably detected.

Various technologies have been described or suggested for detecting and classifying an occupant (a human being, an animal or an object) in order to feed the occupant protection system with occupancy status information required for determining the optimal protection measures in case of an accident. Such technologies include weight or pressure sensing, 2D- or 3D-imaging, thermal imaging, capacitive sensing, detection by radar or ultrasound, etc.

BRIEF SUMMARY OF THE INVENTION

The invention provides a different occupant classification system.

According to the invention, an occupant classification system for a vehicle comprises a radio-frequency (RF) transmitter unit, which includes a transmission RF antenna, preferably (but not necessarily) integrated in a seating portion of a vehicle seat, and an RF generator operatively connected to the transmission RF antenna. The RF generator and the transmission RF antenna are configured for generating radio waves at a certain fixed RF frequency in the Very High Frequency (VHF) range or the Ultra High Frequency (UHF) range. During operation of the RF transmitter unit, the generated radio waves propagate from the transmission RF antenna. The occupant classification system further comprises an RF detector for detecting, at the fixed RF frequency, an influence of an occupant on the radio waves propagating from the transmission RF antenna. As will be appreciated, the present occupant sensing system is based on electromagnetic waves with a frequency in the Very High Frequency range, i.e. in the range from 30-300 MHz, or the Ultra High Frequency range, i.e. in the range from 300-3000 MHz. Preferably, the operating frequency of the occupant classification system is comprised in the frequency range from 100-1000 MHz, most preferably in the Industrial, Scientific and Medical (ISM) bands at 370 MHz or 433 MHz.

According to a first embodiment of the invention, the RF detector is operatively connected to the transmission RF antenna for detecting radio waves reflected to the transmission RF antenna in response to an occupant seated on the seating portion of the vehicle seat. In this embodiment, the RF detector includes a threshold circuit for comparing a signal level of the reflected radio waves with a predefined value. Distinction between different occupancy states of the vehicle seat is achieved based upon the signal level of the reflected radio waves. If, for instance, the signal level is high, i.e. above the predefined value, the threshold circuit is switched into a state that indicates the presence of a human on the seat; if the signal level is low, i.e. below the predefined value, the threshold circuit is switched into a state that indicates that the seat is empty or that an auxiliary child seat is present thereon. The predefined value is calibrated during product development and it should be noted that it might depend on the exact arrangement of the occupant classification system in the seat.

According to a second embodiment, the occupant classification system comprises an RF receiver unit, which includes the RF detector and a reception RF antenna, which is preferably, but not necessarily, integrated in the seating portion of the vehicle seat. The RF detector is operatively connected to the reception RF antenna for receiving at least a part of the radio waves propagating from the transmission RF antenna. As in the first embodiment, the RF detector includes a threshold circuit but in this case the threshold circuit is adapted for comparing a signal level of the received radio waves with a predefined value so as to detect attenuation of the radio waves propagating from the transmission RF antenna in response to an occupant placed on the seating portion of the vehicle seat. According to the second embodiment of the invention, distinction of different seat occupancy states is made based upon the signal level of the radio waves that are received in the reception RF antenna. If the signal level is high in this case, the threshold circuit is switched into a state that indicates that the seat is empty or that an auxiliary child seat is present thereon; if the signal level is low, the threshold circuit is switched into a state that indicates the presence of a human on the seat.

In both the first and second embodiments, the transmission RF antenna may be a dipole antenna. In case of the second embodiment, the reception RF antenna may also be a dipole antenna. Preferably, the antennas are configured and/or dimensioned so that their resonant frequency matches the fixed (i.e. substantially constant in time) operating frequency of the occupant classification system once the antennas are installed in the seat.

In the second embodiment of the occupant classification system, the transmission RF antenna and the reception RF antenna are preferably arranged, e.g. as dipole antennas, in substantially parallel relationship in the seating portion of the vehicle seat, e.g. in the side bolsters of the seating portion. Most preferably, they are also arranged substantially parallel to the seating surface.

To render the occupant classification system more robust against surrounding RF noise, the radio waves preferably carry a special code in form of a modulation. In this case, the RF generator may comprise a modulator for modulating the generated radio waves, preferably by frequency-modulation. It should be noted that, in the context of this invention, radio waves "at a certain fixed frequency" should be interpreted as encompassing radio-waves within a narrow frequency band, e.g. 433.05-434.79 MHz for the ISM band in Europe. In the latter example, the modulation bandwidth is then limited to approximately 1.7 MHz or less if drift of the carrier frequency e.g. due to temperature effects is taken into account.

Preferably, at least one of the transmitting and the receiving RF antennas is arranged in the seating portion of the vehicle seat, whose occupant is to be detected. Most preferably, at least one transmitting RF antenna and at least one receiving RF antenna are arranged in the seating portion. Alternatively or additionally, the transmitting and/or the receiving RF antennas may be arranged at various locations in the vehicle compartment, e.g. in a door proximate to the seat whose occupancy is to be determined, in the seat back thereof or in the ceiling above that seat.

BRIEF DESCRIPTION OF THE DRAWINGS

Preferred embodiments of the invention will now be described, by way of example, with reference to the accompanying drawings, in which.

DETAILED DESCRIPTION OF THE INVENTION

Figure 1:
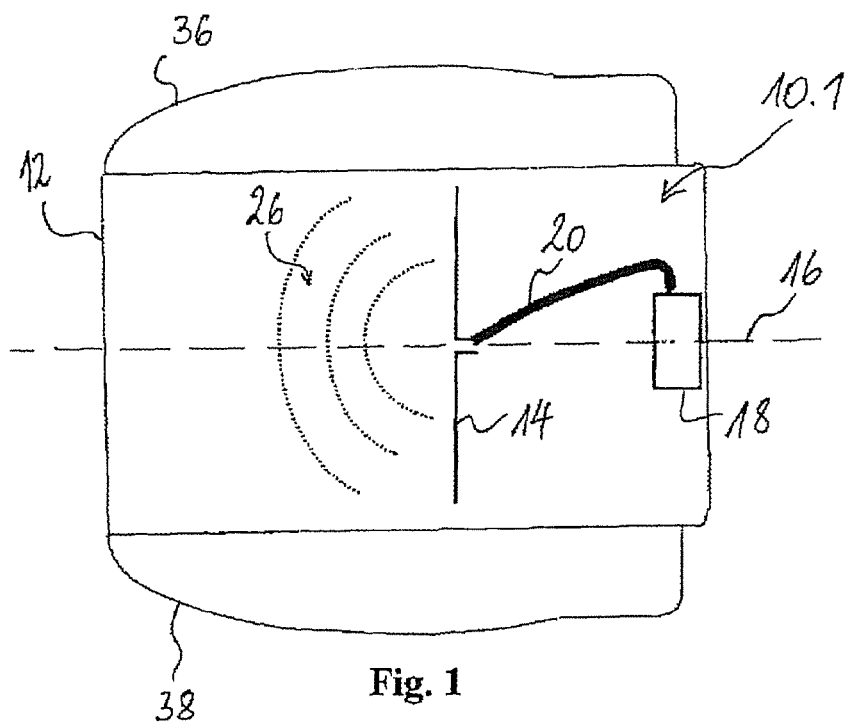
FIG. 1: is a top schematic view of a seating portion equipped with an occupant classification system according to a first embodiment of the invention.
Figure 2:
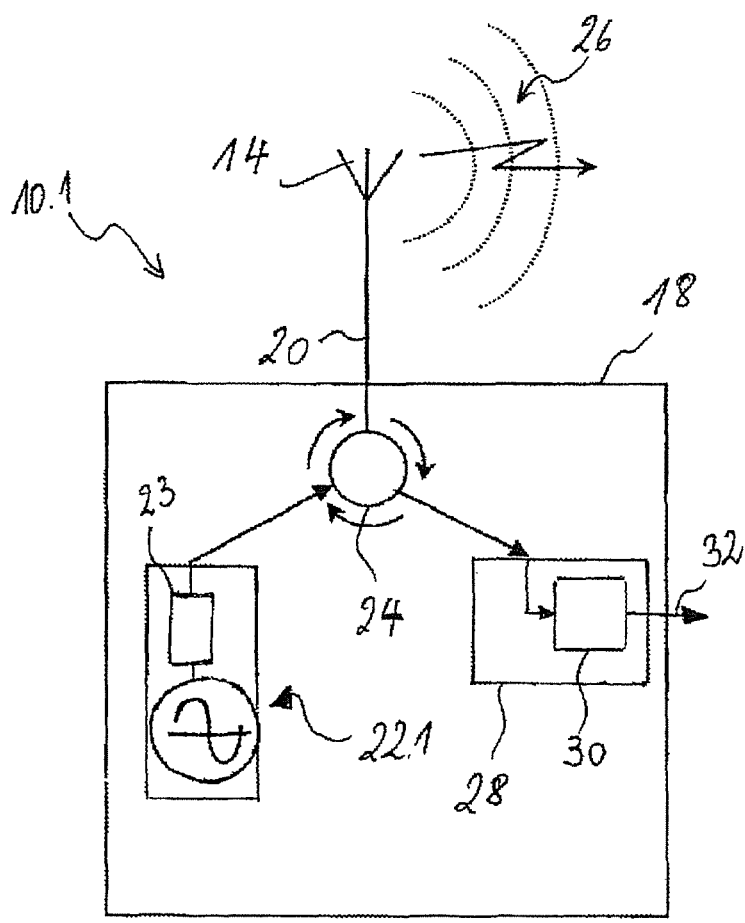
FIG. 2: is a schematic view of the occupant classification system of FIG. 1.

With reference to FIG. 1, an occupant classification system 10.1 is arranged in the seating portion 12 of a vehicle seat. The occupant classification system 10.1 comprises a single dipole antenna 14 arranged substantially parallel to the upper surface of the seating portion 12, in the foam body or under the trim of the seating portion 12. The antenna 14 is oriented substantially perpendicular to the longitudinal axis 16 of the seat. The antenna 14 is centre-fed by an RF generation and reception unit 18, to which the antenna is connected by connection line 20, e.g. a coaxial cable. FIG. 2 shows a schematic of the occupant classification system of FIG. 1. The RF generation and reception unit 18 comprises an RF generator 22.1, which produces VHF or UHF radio waves to drive the antenna 14 at a certain fixed frequency, e.g. 433 MHz. A directional bridge 24 is connected to the RF generator 22.1 in such away that the VHF or UHF radio waves produced are fed into the antenna 14.

The antenna 14 emits the radio waves into its surroundings, as illustrated at numeral 26. The impedance of antenna 14 depends on its surroundings. Depending on whether an occupant is seated or not seated on the seating portion 12, the impedance of the antenna will be matched or mismatched with the impedance of the RF generation and reception unit 18. In case of impedance mismatching, part of the radio waves will be reflected back to the RF generation and reception unit 18. The directional bridge 24 directs the reflected radio waves to an RF detector 28. The RF detector 28 includes a threshold circuit 30, which compares the signal level of the reflected radio waves with a predefined value. The threshold circuit 30 outputs a status signal 32, which indicates whether the signal level of the reflected radio waves lies above or below the predefined value. In this embodiment, if the signal level is higher than the predefined value, the status signal indicates that the seat is occupied y a passenger; if the signal level is lower than the predefined value, the status signal indicates that the seat is empty or a child seat is placed thereon. The signal 32 can be fed into a control unit of an auxiliary restraint system or a seat belt reminder.

In FIG. 2, the RF generator is shown comprising a modulator 23. The modulator 23 modulates the radio waves according to a predetermined pattern, which allows better distinction between surrounding electromagnetic "noise" and the radio waves generated in the occupant classification system. The modulation of the radio waves renders the occupant classification system more robust against electromagnetic interference.

Those skilled will appreciate that the shown configuration is well suited for distinguishing between an adult passenger and an auxiliary child restraint seat placed on the vehicle seat. Indeed, CRS that are equipped with metal bars generally have these metal bars extending in longitudinal direction, i.e. substantially parallel to the axis 16. Therefore, the radio waves propagating from the antenna 14 are reflected significantly less than they would be by a passenger seated on the seating portion 12.

Figure 3:
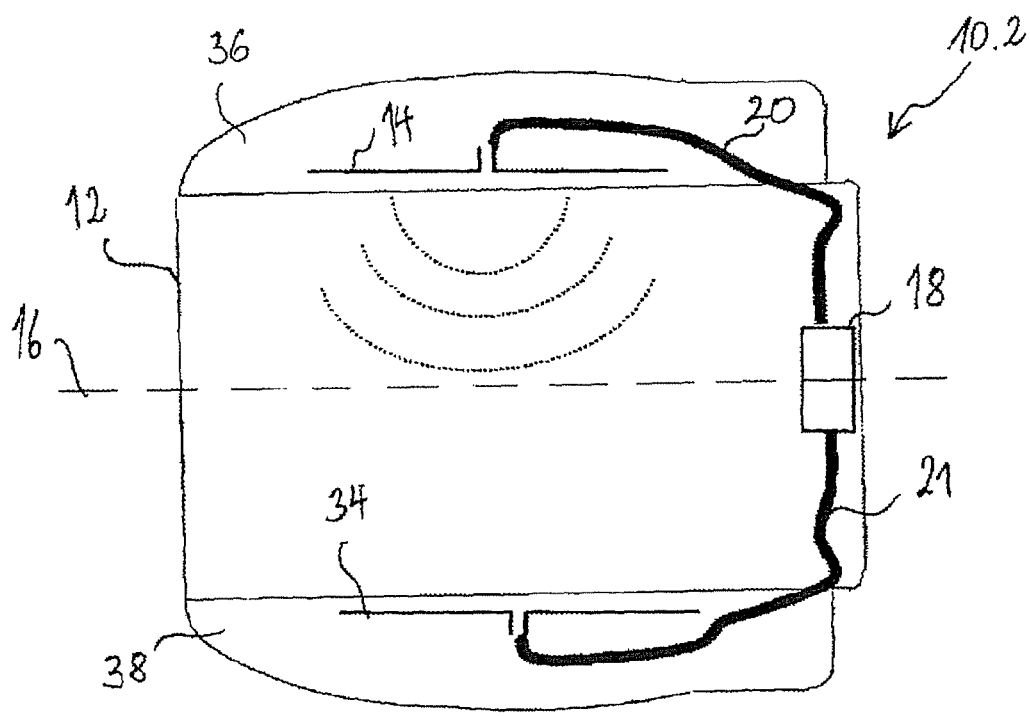
FIG. 3: is a top schematic view of a seating portion equipped with an occupant classification system according to a second embodiment of the invention.
Figure 4:
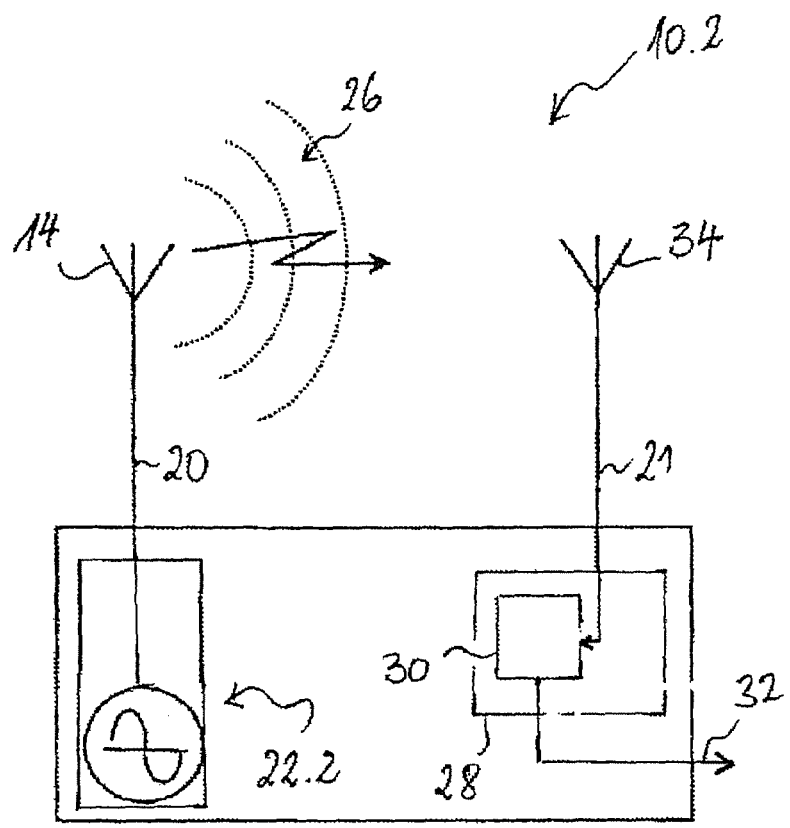
FIG. 4: is a schematic view of the occupant classification system of FIG. 3.

FIGS. 3 and 4 show an occupant classification system 10.2 according to a second embodiment of the invention. The occupant classification system 10.2 is integrated into the seating portion 12 of a vehicle seat. The system 10.2 comprises a transmission RF dipole antenna 14 and a reception RF dipole antenna 34, which are arranged in the side bolsters 36, 38 of the seating portion 12, in the foam body or under the trim of the side bolsters 36, 38. The antennas 14 and 34 are disposed substantially parallel to each other and to the surface of the seating portion 12. The antennas 14, 34 are connected to an RF generation and reception unit 18 by means of connection lines 20, 21. The RF generation and reception unit 18 drives the transmission antenna 14 by an RF generator 22.2, which produces VHF or UHF radio waves at a certain fixed frequency. The RF generation and reception unit 18 also includes an RF detector 28, operationally connected to the reception antenna 34. The RF detector 28 includes a threshold circuit 30, which determines whether the signal level of the radio waves that are transmitted from the transmission RF antenna 14 to the reception RF antenna 34 lies above or below a predefined value.

In case a passenger is seated on the seating portion 12, the signal level of the radio waves received at the RF detector 28 is substantially decreased in comparison to the signal level in case of an empty seat or a CRS placed on the seating portion 12. This is due to the impedance mismatch of the transmitting RF antenna 14 to the RF generator 22.2, caused by the presence of the passenger in proximity of the RF transmitting antenna 14, to the attenuation of radio waves in the passenger's body and to the impedance mismatch of the receiving RF antenna 34 to the RF detector 28. The threshold circuit 30 outputs a status signal 32, which reflects the outcome of the comparison between the signal level and the predefined value. If the signal level is higher than the predefined value, the status signal indicates that the seat is empty or carries a CRS; in the contrary case the status signal indicates that a passenger occupies the seat. As in the previously discussed embodiment of the invention, the signal 32 can be fed into a control unit of an auxiliary restraint system or a seat belt reminder.

In both of the discussed embodiments of the invention, the generation and reception unit 18 may also include an impedance matching network, which is however not shown in the drawings. All the components of the occupant classification systems 10.1 or 10.2, such as the RF generator, the RF detector, etc., are preferably optimised for operating at the certain fixed frequency. Although the RF generator 22.2 is shown without a modulator, those skilled will appreciate that a modulator could be included in the RF generator used for the second embodiment of the invention.

Figure 5:
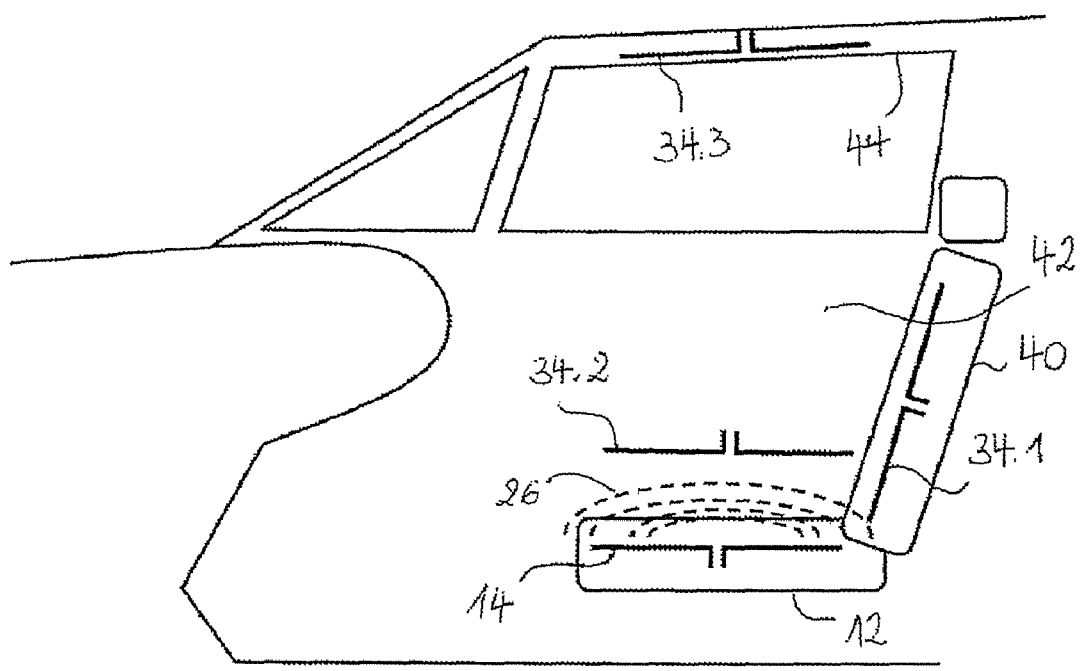
FIG. 5: is a schematic view of an occupant classification system according to a third embodiment of the invention.

FIG. 5 illustrates the arrangement of RF antennas 14, 34.1, 34.2, 34.3 of an occupant classification system 10.3 according to a third embodiment of the invention. Occupant classification system 10.3 comprises a transmitting RF antenna 14 disposed in the seating portion 12 of a vehicle seat and a plurality of receiving RF antennas 34.1, 34.2, 34.3 arranged in the back portion 40 of the vehicle seat, a vehicle door 42 and the ceiling 44 of the vehicle compartment, respectively. Radio waves 26 emitted by the transmitting RF antenna 14 into the space above the seating portion 12 can be received at receiving antennas 34.1, 34.2, 34.3. If a person occupies the region between the transmitting antenna 14 and the receiving electrodes 34.1, 34.2, 34.3, the signal level at the latter is reduced with respect to the situation when no occupant is present. Additionally, due to impedance mismatching, more energy is reflected back to the transmitting antenna 14 if the seat is occupied than if it is empty. The occupant classification system includes an RF detector (not shown in FIG. 5), connected to the receiving antennas 34.1, 34.2, 34.3 and, optionally, to the transmitting antenna 14. The RF detector includes a threshold circuit, which compares the signal levels in the different antennas with predefined values. The RF detector thereby determines the attenuation of the radio waves propagating from the transmission RF antenna 14 to the receiving antennas 34.1, 34.2, and 34.3. If the RF detector is also connected to the transmitting antenna 14 (e.g. as shown in FIG. 1), the RF detector also determines the signal level of the reflected radio waves.

It should be noted that one could give the role and function of the transmitting RF antenna to any one of the antennas 34.1, 34.2, 34.3 in the back portion 40 of the vehicle seat, the vehicle door 42 and the ceiling 44 of the vehicle compartment without departing from the scope of the present invention. In such case, antenna 14 in the seating portion 12 of the seat would preferably take the role and function of a receiving RF antenna.

The invention claimed is:

1. A combination of a vehicle seat and an occupant classification system for a vehicle,
    wherein said vehicle seat comprises a seating portion and a backrest portion, said seating portion further comprising side bolsters;
    wherein said occupant classification system for a vehicle comprises:
        an RF transmitter unit, said RF transmitter unit including a transmission RF antenna and an RF generator operatively connected to said transmission RF antenna, said RF generator and said transmission RF antenna being configured for generating radio waves at a certain fixed RF frequency in at least one of the Very High Frequency range and the Ultra High Frequency range, said radio waves propagating from said transmission RF antenna during operation of the RF transmitter unit; and
        an RF detector configured so as to detect at said fixed RF frequency an influence of a vehicle occupant on the radio waves propagating from said transmission RF antenna,
    and wherein said transmission RF antenna is arranged in one of said side bolsters.

2. The combination of a vehicle seat and an occupant classification system according to claim 1, wherein said fixed RF frequency is situated in a frequency band between 100 MHz and 1 GHz.

3. The combination of a vehicle seat and an occupant classification system according to claim 1, wherein said RF generator comprises a modulator modulating the generated radio waves.

4. The combination of a vehicle seat and an occupant classification system according to claim 1, wherein said transmission RF antenna is a dipole antenna.

5. The combination of a vehicle seat and an occupant classification system according to claim 4, wherein said reception RF antenna is integrated in one of said side bolsters of said seating portion of said vehicle seat.

6. The combination of a vehicle seat and an occupant classification system according to claim 1, comprising an RF receiver unit, said RF receiver unit including said RF detector and a reception RF antenna, said RF detector being operatively connected to said reception RF antenna in such a way as to receive at least a part of the radio waves propagating from said transmission RF antenna, wherein said RF detector includes a threshold circuit configured so as to detect attenuation of the radio waves propagating from said transmission RF antenna in response to said vehicle occupant by comparing a signal level of the received radio waves with a predefined value.

7. The combination of a vehicle seat and an occupant classification system according to claim 6, wherein said reception RF antenna is integrated in a seating portion of a vehicle seat.

8. The combination of a vehicle seat and an occupant classification system according to claim 6, wherein said reception RF antenna is a dipole antenna.

9. The combination of a vehicle seat and an occupant classification system according to claim 6, wherein said RF receiver unit comprises a plurality of receiving RF antennas arranged in a vehicle compartment.

10. A vehicle comprising:
    a vehicle compartment;
    a vehicle seat arranged in said vehicle compartment, said vehicle seat comprising a seating portion and a backrest portion, said seating portion further comprising side bolsters; and
    an occupant classification system, said occupant classification system including:
        an RF transmitter unit, said RF transmitter unit including a transmission RF antenna integrated into said vehicle seat and an RF generator operatively connected to said transmission RF antenna, wherein said RF generator and said transmission RF antenna generate radio waves at a certain fixed RF frequency in at least one of the Very High Frequency range and the Ultra High Frequency range, wherein said radio waves propagate from said transmission RF antenna during operation of the RF transmitter unit; and an RF detector detecting at said fixed RF frequency an influence of an occupant seated in said vehicle seat on the radio waves propagating from said transmission RF antenna, and wherein said transmission RF antenna is arranged in one of said side bolsters.

11. The vehicle according to claim 10, wherein said occupant classification system comprises an RF receiver unit, said RF receiver unit including said RF detector and a reception RF antenna, said RF detector being operatively connected to said reception RF antenna in such a way as to receive at least a part of the radio waves propagating from said transmission RF antenna, wherein said RF detector includes a threshold circuit configured so as to detect attenuation of the radio waves propagating from said transmission RF antenna in response to said occupant seated in said vehicle seat by comparing a signal level of the received radio waves with a predefined value.

12. The vehicle according to claim 11, wherein said transmission RF antenna is integrated in said seating portion.

13. The vehicle according to claim 12, wherein said reception RF antenna is integrated in one of said side bolsters of said seating portion of said vehicle seat.

14. The vehicle according to claim 13, wherein said transmission RF antenna and said reception RF antenna are arranged in substantially parallel relationship.

* * * * *